United States Patent [19]

Sullivan et al.

[11] Patent Number: 5,891,973
[45] Date of Patent: Apr. 6, 1999

[54] METHOD OF IMPROVING SCUFF AND CUT RESISTANCE OF IONOMER COVERED GAME BALL

[75] Inventors: Michael J. Sullivan, Chicopee; Thomas Kennedy, Wilbraham, both of Mass.

[73] Assignee: Lisco, Inc., Tampa, Fla.

[21] Appl. No.: 942,653

[22] Filed: Oct. 2, 1997

Related U.S. Application Data

[63] Continuation of Ser. No. 595,898, Feb. 6, 1996, abandoned.
[51] Int. Cl.$^6$ ....................................................... C08F 30/04
[52] U.S. Cl. ................................................................. 526/240
[58] Field of Search ............................................. 526/240

[56] References Cited

U.S. PATENT DOCUMENTS

| | | | |
|---|---|---|---|
| 2,805,072 | 9/1957 | Smith | 273/235 |
| 3,992,241 | 11/1976 | Ferrari | 156/272 |
| 4,056,421 | 11/1977 | Jarvis | 156/272 |
| 4,303,697 | 12/1981 | Baseden | 427/54.1 |
| 4,871,589 | 10/1989 | Kitaoh et al. | 427/322 |
| 4,884,814 | 12/1989 | Sullivan . | |
| 4,911,451 | 3/1990 | Sullivan et al. | 273/235 R |
| 5,000,459 | 3/1991 | Isaac | 273/235 R |
| 5,120,791 | 6/1992 | Sullivan . | |
| 5,200,122 | 4/1993 | Katoh et al. | 264/22 |
| 5,266,362 | 11/1993 | Katoh et al. | 427/553 |
| 5,286,532 | 2/1994 | Yoshikawa et al. | 427/536 |
| 5,397,840 | 3/1995 | Sullivan et al. . | |
| 5,415,937 | 5/1995 | Cadorniga et al. . | |
| 5,492,972 | 2/1996 | Stefani | 525/196 |
| 5,516,847 | 5/1996 | Sullivan et al. . | |
| 5,542,677 | 8/1996 | Sullivan et al. . | |

FOREIGN PATENT DOCUMENTS

| | | | |
|---|---|---|---|
| 650959 | 10/1962 | Canada | 273/40 |
| 0 056 181 | 7/1982 | European Pat. Off. . | |
| 0 471 079 A1 | 2/1992 | European Pat. Off. . | |
| 49-5149 | 1/1974 | Japan . | |
| 57-159824 | 10/1982 | Japan . | |
| 58-098340 | 6/1983 | Japan . | |
| 59-147027 | 8/1984 | Japan . | |
| 4061870 | 2/1992 | Japan . | |
| 911147 | 11/1962 | United Kingdom . | |
| 91/11484 | 8/1991 | WIPO . | |

OTHER PUBLICATIONS

"Electron Curing", *Applied Polymer Science,* McGinnis and Gruber, pp. 852–853 1986.
"Radiation–Induced Changes in Polyolefins", A.K. Mukherjee, B.D. Gupta and P.K. 1986 Sharma, Indian Institute of Technology: Delhi, copyright 1986 Marcel Dekker Inc.
"High–Energy Ion Implantation in Polymer Films", L Ya Alimova et al, *Vacuum,* vol. 43, Nos. 5–7, pp. 699–701 (1992).
"Dual IBAD Makes Good Coatings", B. Haywood, Advanced Materials & Processes, ASM International, vol. 138, Issue 6, Dec. 1990.
Citation for Japanese patent 74001301, Jan. 1974.
"High Energy Ion Beam Modification of Polymer Films", T. Venkatesan, Bell Communications Research, *Nuclear Instruments and Methods in Physics Research* B 7/8 (1985) pp. 461–467.
"Preparation and Characterization of Ion Beam Assisted Aluminum Oxide Films", J.K. Hirvonen et al., presented at 1989 Fall MRS Conference.
"Surface Modification of Polymers and Ceramics", J.K. Hirvonen, Spire Corp., May 1986, reprinted from *Advanced Materials and Processes,* May 1986.
"Superhard–Surfaced Polymers Made by High–Energy Ion Irradiation", R. Dagani, *Chemical and Engineering News,* Jan. 9, 1995, pp. 24–25.
"Surface Engineering by Ion Implantation", P. Sioshansi, Ph.D., Spire Corp., *Precision Metal,* Dec. 1988.
"Sports Illustrated", Nuclear power, (study shows irradiated golf balls travel farther) (Scorecard), vol. 73, No. 4, p. 18 (1), Jul. 23, 1990.

*Primary Examiner*—Joseph L. Schofer
*Assistant Examiner*—N. Sarofim

[57] ABSTRACT

Disclosed herein is a game ball and method for making the same. The game ball has an ionomeric cover which includes a combination of ionomeric crosslinks and covalent crosslinks. The game ball cover is superior in at least one of cut resistance and scuff resistance to a conventional cover that does not have covalent crosslinks but is otherwise substantially identical in composition. The game ball cover of the invention is particularly useful for improving the durability of golf balls to be struck with sharp-grooved clubs.

11 Claims, 1 Drawing Sheet

METHOD OF IMPROVING SCUFF AND CUT RESISTANCE OF IONOMER COVERED GAME BALL

This application is a continuation Ser. No. 08/595,898 filed on Feb. 06, 1996 abandoned.

BACKGROUND OF THE INVENTION

This invention relates generally to game balls, and more particularly to a game ball, such as a golf ball, having an ionomeric cover.

Before the development of ionomers, balata was the preferred material for golf ball covers. Polyethylene also was proposed for use as a golf ball cover material but was generally deemed highly inferior to balata in imparting playability and durability characteristics to the ball due to its brittleness and high hardness, and thus never became a commercially successful golf ball cover material.

Balata golf ball covers have now been replaced to a great extent by ionomeric cover materials. Ionomers are copolymers of an olefin and an $\alpha$, $\beta$-ethylenically unsaturated carboxylic acid with a portion of the carboxylic acid groups neutralized by a metal ion. The metal ions serve as crosslinking agents, as they are ionically bonded to carboxylic acid groups in adjacent copolymer chains. Instead of having thermally irreversible covalent bonding, ionomers have thermolabile crosslinking in which metal ions become part of the chemical structure of the ionomer upon crosslinking, and these crosslinks are reversible. For purposes of this application, this type of crosslinking is referred to as ionic crosslinking. One of the advantages of ionic crosslinking in golf ball materials is the ability of ionic bonds to re-form after breaking as a result of processing at elevated temperatures.

There are numerous advantages to the use of ionomers in making golf ball covers. On the other hand, one drawback of conventional golf balls with soft ionomeric covers are that the covers are prone to scuffing and cutting, particularly when hit with irons which have sharp grooves. It would be useful to develop a golf ball with a soft ionomeric cover which is highly resistant to cutting and scuffing by sharp-grooved clubs.

SUMMARY OF THE INVENTION

An object of the invention is to provide an ionomeric game ball cover having improved scuff resistance and/or cut resistance.

Another object of the invention is to provide a method for imparting improved scuff resistance and/or cut resistance to a game ball cover.

Yet another object of the invention is to provide a golf ball with a soft cover which is well-suited for use with golf club irons having sharp grooves.

Yet another object of the invention is to provide a method of forming a golf ball with a soft cover which has excellent scuff resistance and/or cut resistance.

Other objects will be in part obvious and in part pointed out more in detail hereinafter.

The invention in a preferred form is a game ball having a cover comprising an ionomer resin. The ionomer resin includes a copolymer of an olefin and an $\alpha,\beta$-ethylenically unsaturated carboxylic acid which is about 10–100% neutralized with metal ions. The copolymer has a sufficient degree of covalent crosslinking to impart to the cover improved resistance to at least one of scuffing and cutting. In a particularly preferred form of the invention, the game ball is a golf ball. Preferably, the game ball has a dimpled surface. The covalent crosslinking preferably comprises irradiation-induced covalent crosslinking.

In a preferred form of the invention, the degree of covalent crosslinking is appropriate to impart to the cover a Shore D hardness which is no more than about 10% greater, and more preferably no more than about 5% greater, than the Shore D hardness of a cover having an identical composition but which does not include a substantial degree of covalent crosslinking. Preferably, the copolymer includes an acrylate.

Another preferred form of the invention is a method of treating a game ball. The method comprises the steps of obtaining a game ball having a cover comprising an ionomer, and irradiating the ionomer in the cover under conditions appropriate to covalently crosslink the ionomer in order to increase the resistance of the cover to at least one of scuffing and cutting without substantially impairing other playability characteristics of the ball. In a particularly preferred form of the invention, the game ball is a golf ball. Preferably, the game ball has a dimpled surface.

According to the preferred method of the invention, the game ball is subjected to electron beam treatment at a dosage of at least 2 megarads. The game ball cover preferably is irradiated prior to application of a top coat over a cover. The method of the invention preferably further includes the step of applying a top coat over the cover before or after irradiation.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The game balls of the present invention are surprisingly superior in their scuff (abrasion) resistance and cut resistance to conventional game balls which have not been electron beam treated, and which contain similar quantities of ionomer and have a similar hardness. Furthermore, the golf balls and other game balls of the invention are comparable in scuff and cut resistance to game balls having non-ionomeric compositions, such as polyurethanes, with similar properties of compression, coefficient of restitution (COR) and hardness.

The game balls of the invention are formed by first obtaining an uncoated or coated game ball having an ionomeric cover. An "uncoated" game ball as the term is used in this application is a one, two, or multi-piece game ball to which no primer or top coat has been applied over the ionomeric cover. In contrast, a "coated" game ball as this term is used in this application is a ball which has a primer coat and/or a top coat over the ionomeric cover layer. The coated or uncoated game ball of the invention is subjected to irradiation under conditions appropriate to induce covalent crosslinking of the ionomer. This type of direct covalent bonding has been found to take place in ionomeric cover materials when electron beam treatment is applied at a dosage of 2 or more megarads and is expected to also be useful at lower dosages, for example, 1 megarad.

For clarity of description and ease of understanding, the invention will be described in connection with golf balls although it will be understood that other game balls, including but not limited to softballs, basketballs, baseballs, soccer balls, volleyballs, street hockey balls, footballs, and the like, can advantageously employ the features of the present invention.

Figure 1:
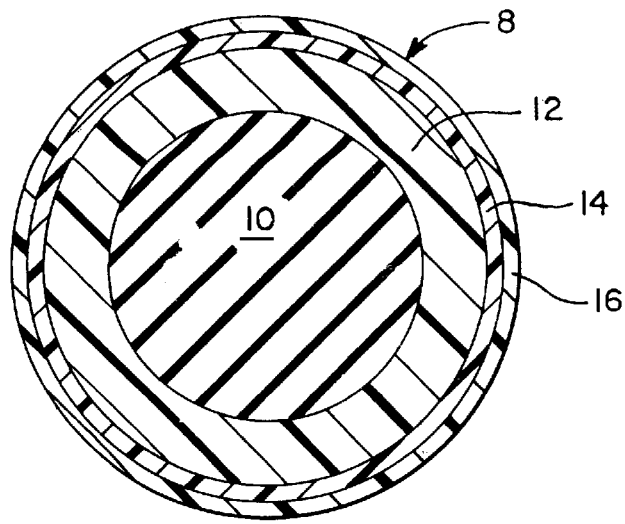
FIG. 1 shows a golf ball according to the present invention.

Referring now to the drawings, and in particular to FIG. 1, a golf ball according to the present invention is shown and is designated as 8. The ball has a core 10, which is solid, or is formed from any other suitable type of core composition. An ionomeric cover 12 surrounds the core 10. A thin primer coat 14 is applied to the outer surface of cover 12. A thin top coat 16 surrounds the primer coat 14. The thicknesses of primer coat 14 and top coat 16 are exaggerated for illustrative purposes.

In accordance with the present invention, after the cover layer 12 is applied over the core, the cover layer 12 is subjected to irradiation at a dose of about 1 or more megarads in order to covalently crosslink the ionomeric cover material. Particularly good results are obtained when the dosage is 2–12 megarads. In a most preferred form of the invention, a dosage of 4–8 megarads is utilized. As used herein, the term "irradiation" refers to short-duration irradiation using an electron beam or the like, rather than to mere exposure to sunlight, which would result in a dosage of well below 1 megarad. Irradiation takes place at a temperature below the melting or deformation temperature of the cover layer, and for convenience preferably takes place at ambient temperature.

The cover 12 can be irradiated prior to or after application of primer coat 14 and top coat 16. Furthermore, primer coat 14 can be eliminated if adhesion of top coat 16 to cover 12 is sufficient to render the ball suitable for competitive play, as is commonly the case with softballs and baseballs, and may also be the case for other game balls.

The game ball of the invention can be irradiated with electrons, neutrons, protons, gamma rays, x-rays, helium nuclei, or the like. In a particularly preferred form of the invention, the scuff and cut resistance of cover 12 is enhanced by subjecting the cover to electron beam treatment at a dosage sufficient to significantly improve scuff resistance and COR without excessively hardening the compression. The game ball preferably obtains an improvement in COR of at least 0.5% as a result of irradiation of the cover.

The cover composition preferably contains high quantities of ionomer. Thus, the irradiated cover material has a combination of ionic crosslinks and covalent crosslinks. Particularly preferred ionomers or ionomer blends include ionic copolymers containing an olefin, an unsaturated carboxylic acid, and an acrylate. Such polymers typically, although not necessarily, have a Shore D hardness in the range of 20–60. Non-ionomeric materials can be blended with the ionomer as long as an acceptable increase in scuff resistance and/or cut resistance is obtained as a result of covalent crosslinking of the ionomer. Non-limiting examples of materials to be blended with an ionomer include ethylene-ethyl acrylate, ethylene-methyl acrylate, ethylene-vinyl acetate, low density polyethylene, linear low density polyethylene, metallocene catalyzed polyolefins such as ENGAGE polyolefins available from Dow Chemical and EXACT polyolefins available from Exxon, non-ionomeric acid copolymers such as PRIMACOR, available from Dow Chemical, and NUCREL, available from Du Pont, and a variety of thermoplastic elastomers, including KRATON, available from Shell, SANTOPRENE, available from Monsanto, and HYTREL, available from DuPont, etc.

If the game ball cover is irradiated prior to application of a primer coat 14 and/or top coat 16, there is no particular restriction on the type of primer coat and/or top coat to be used. If irradiation occurs after application of a primer coat and/or a top coat over the cover 12, it is important to ensure that the radiation will penetrate the coating and that the dosage of radiation is sufficient to covalently crosslink the cover material without adversely affecting the properties of the primer and/or top coat to a substantial degree. Due to the thinness of the primer coat and top coat on most game balls, including golf balls, it has been found that little change in radiation dosage is required if irradiation occurs after application of such coatings.

Golf balls according to the invention preferably have a post-irradiation PGA compression of 10–110. In a particularly preferred form of the invention, the golf balls have a PGA compression of about 40–100 after irradiation. It has been found that excellent results are obtained when the post-irradiation PGA compression of the golf balls is 60–100. The irradiation method of the invention preferably results in an increase in PGA compression of at least 5% as compared to the PGA compression of the ball prior to treatment. The coefficient of restitution of the golf balls of the invention after treatment is in the range of 0.780 or greater. Preferably, the COR of the golf balls is in the range of 0.790–0.830 and most preferably 0.800–0.830. The Shore D hardness of the golf balls of the invention after irradiation is in the range of 40–80.

Particularly good results are obtained when the Shore D hardness of the golf balls is in the range of 50–70, and most preferably 50–60.

The invention is particularly well suited for use in making dimpled, pebbled, and other game balls which do not have a smooth outer surface, including game balls with simulated stitching. A smooth ball is less susceptible to scuffing than a dimpled ball since dimples give the golf club groove a sharp-edged surface to "catch." Pebbles clearly are susceptible to shearing when dribbled on a hard surface, or the like. Likewise on a molded-cover softball, the stitching is a raised area that will be sheared or compressed more than the smooth-surfaced area by a bat and/or by the turf, dirt, etc.

Figure 2:
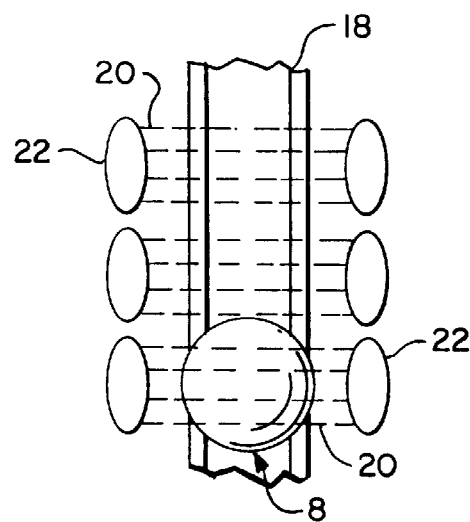
FIGS. 2–3 schematically show one embodiment for practicing the method of the invention.
Figure 3:
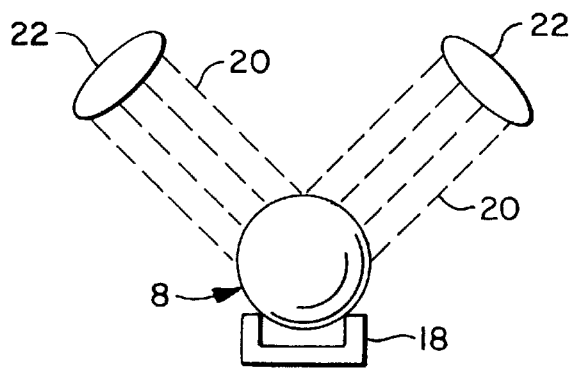

One embodiment of a method for electron beam treating golf balls according to the invention can be described in connection with FIGS. 2 and 3. The golf ball 8 is placed on a channel 18 along which it slowly moves. Electrons 20 from electron beam lamps 22 contact the surface of the ball 8. The lamps are positioned to provide a generally uniform dose of radiation on the entire surface of the ball as the ball rolls along the channel 18. Preferably, the balls are irradiated with an electron beam dosage of 1 or more megarads, more preferably 2–12 megarads. The intensity of the dosage preferably is in the range of 1–20 MeV.

The golf balls of the invention are found to exhibit a post-treatment scuff resistance in the range of 1–3 on a scale of 1–4. It is preferred that the treatment be appropriate to provide the golf balls with a scuff resistance of 1–2.5, and more preferably 1–2. Golf balls according to the invention have a cut resistance in the range of 1–3 on a scale of 1–5. It is preferred that the golf balls of the invention have a cut resistance of 1–2.5 and most preferably 1–2.

The scuff resistance test was conducted in the following manner: a Top-Flite Tour pitching wedge (1994) with box grooves was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a clubhead speed of 125 feet per second. Three samples of each ball were tested. Each ball was hit three times. After testing, the balls were rated according to the following table:

| Rating | Type of damage |
| --- | --- |
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

Cut resistance was measured in accordance with the following procedure: A golf ball was fired at 135 feet per second against the leading edge of a 1994 Top-Flite Tour pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1–5. A 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

It has been found that golf balls which are treated according to the irradiation technique of the present invention exhibit a particular improvement in scuff and/or cut resistance. This improvement is particularly significant when the golf balls are struck with a square-grooved iron. It is has been found that square-grooved irons and other sharp-grooved irons tend to abrade and damage golf ball covers more readily than irons having "V-type" grooves.

Having generally described the invention, the following examples are included for purposes of illustration so that the invention may be more readily understood and are in no way intended to limit the scope of the invention unless otherwise specifically indicated.

EXAMPLE 1

Polybutadiene golf ball cores having an average coefficient of restitution (COR) of 0.790 and a PGA compression of 90 were obtained. The cores were covered with a relatively soft, 0.055 inch thick cover formed from an ionomeric composition, designated as ionomer 1, which includes a blend of a hard sodium ionomer and a soft zinc ionomer. Pigments and an optical brightener were also included in the cover composition. The hard ionomer is a copolymer containing two monomer types, namely an α-olefin and an acrylic-type carboxylic acid. The soft ionomer is a copolymer which contains three types of monomers, namely an α-olefin, an acrylic-type carboxylic acid, and an acrylate. The cover was formed over the core. The balls were primed with a polyurethane-based primer with a thickness of about 0.5 thousandths of an inch and coated with a polyurethane top coat with a thickness of about 0.5 thousandths of an inch. The properties of these balls prior to electron beam treatment are shown on Table 1.

A portion of the balls were subjected to electron beam treatment at dosages of 2, 4, 6, 8 and 11 megarads at an energy level of 10 MeV. Changes in the properties of the balls are shown on Table 1.

As indicated on Table 1, the scuff resistance of the golf balls substantially improved between electron beam dosages of 2 and 6 megarads. The cut resistance of the balls improved between electron beam dosages of 6 and 8 megarads. Meanwhile, the change in Shore D hardness in the dosage range of 2 to 8 was only 1.

EXAMPLE 2

Golf ball cores having an average PGA compression of 85 and an average COR of 0.800 were obtained. The cores were covered with a hard zinc-sodium ionomeric cover composition containing two monomer types, namely an α-olefin and a carboxylic acid. The initial properties of the covered cores prior to priming and finish coating are shown on Table 1.

A portion of the golf balls were primed with the same polyurethane-based primer as was used in Example 1 and then coated with the same polyurethane top coat as was used in Example 1. Subsequently, a portion of both the unprimed and unfinished golf balls and the primed and finished golf balls were subjected to electron beam treatment in the dosages shown on Table 1. Properties of compression, COR, Shore D hardness and scuff resistance are shown on Table 1.

As indicated in Table 1, the scuff resistance of the finished golf balls increased substantially while resulting in a minimal increase in Shore D hardness.

As will be apparent to persons skilled in the art, various modifications and adaptations of the structure above described will become readily apparent without departure from the spirit and scope of the invention, the scope of which is defined in the appended claims.

TABLE 1

| Cover Material | Dosage (Megarads) | Weight | PGA Comp. | COR | Shore D | Scuff Resistance | Cut Resistance |
| --- | --- | --- | --- | --- | --- | --- | --- |
| Ionomer Blend 1 (coated prior to treatment) | 2.0 | 45.5 | 93 | .788 | 54 | 2.5 | 2–3 |
| | 4.0 | 45.5 | 97 | .797 | 55 | 1–2 | 2–3 |
| | 6.0 | 45.5 | 98 | .795 | 55 | 1.5 | 2–3 |
| | 8.0 | 45.5 | 98 | .797 | 55 | 1.5 | 2 |
| | 11.0 | 45.5 | 101 | .802 | 55 | 1.5 | 2 |
| | 0 | 45.5 | 92 | .787 | 54 | 3.5 | 3 |
| Ionomer Blend 2 (uncoated) | 2.0 | 45.4 | 96 | .822 | 63 | — | — |
| | 4.0 | 45.4 | 97 | .822 | 63 | — | — |
| | 0 | 45.4 | 88 | .812 | 62 | — | — |
| Ionomer Blend 2 (coated with primer and top coat prior to treatment) | 6.0 | 45.5 | 101 | .829 | 64 | 1.5 | 1–2 |
| | 8.0 | 45.5 | 103 | .828 | 64 | 1.5 | 1–2 |
| | 0 | 45.5 | 88 | .813 | 63 | 2.0 | 1–2 |

We claim:

1. A game ball having a cover comprising an ionomer resin, the ionomer resin including a copolymer of an olefin, an α, β-ethylenically unsaturated carboxylic acid which is about 10–100% neutralized with metal ions and an acrylate, the copolymer having a sufficient degree of covalent crosslinking to impart to the cover improved resistance to at least one of scuffing and cutting, the extent of covalent crosslinking being that which results from a radiation dosage of at least 1 megarad.

2. A game ball according to claim 1, wherein the game ball is a golf ball.

3. A game ball according to claim 1, wherein the cover has a dimpled surface.

4. A game ball according to claim 1, wherein the covalent crosslinking comprises radiation-induced covalent crosslinking.

5. A game ball according to claim 1, wherein the degree of covalent crosslinking is appropriate to impart to the cover a Shore D hardness which is no more than about 10% greater than the Shore D hardness of a cover having a substantially identical composition but which does not include a substantial degree of covalent crosslinking.

6. A game ball according to claim 1, wherein the cover has a Shore D hardness of about 65 or less.

7. A game ball according to claim 4, wherein the degree of covalent crosslinking is sufficient to impart to the ball a coefficient of restitution which is at least 0.50% greater than a coefficient of restitution of a ball with a cover having a substantially identical composition but which does not have radiation-induced covalent crosslinking.

8. A game ball according to claim 2, wherein the degree of covalent crosslinking is sufficient to impart to the ball a PGA compression which is at least 5% harder than the PGA compression of a golf ball with a cover having a substantially identical composition but which does not have a substantial degree of covalent crosslinking.

9. A game ball having a cover comprising an ionomer resin, the ionomer resin including a copolymer of an $\alpha$-olefin, an acrylate, and an $\alpha, \beta$-ethylenically unsaturated carboxylic acid which is about 10–100% neutralized with metal ions, the copolymer having a degree of radiation-induced covalent crosslinking that results from a radiation dosage of at least 1 megarad and which is sufficient to substantially improve the resistance of the cover to at least one of scuffing and cutting while resulting in a cover hardness (Shore D) which is no more than about 5.0% higher than the Shore D hardness of a cover which is substantially identical in composition but does not contain covalent crosslinking.

10. A game ball according to claim 9, wherein the game ball is a golf ball.

11. A game ball according to claim 9, wherein the cover has a dimpled surface.

* * * * *